Figures 1, 2:
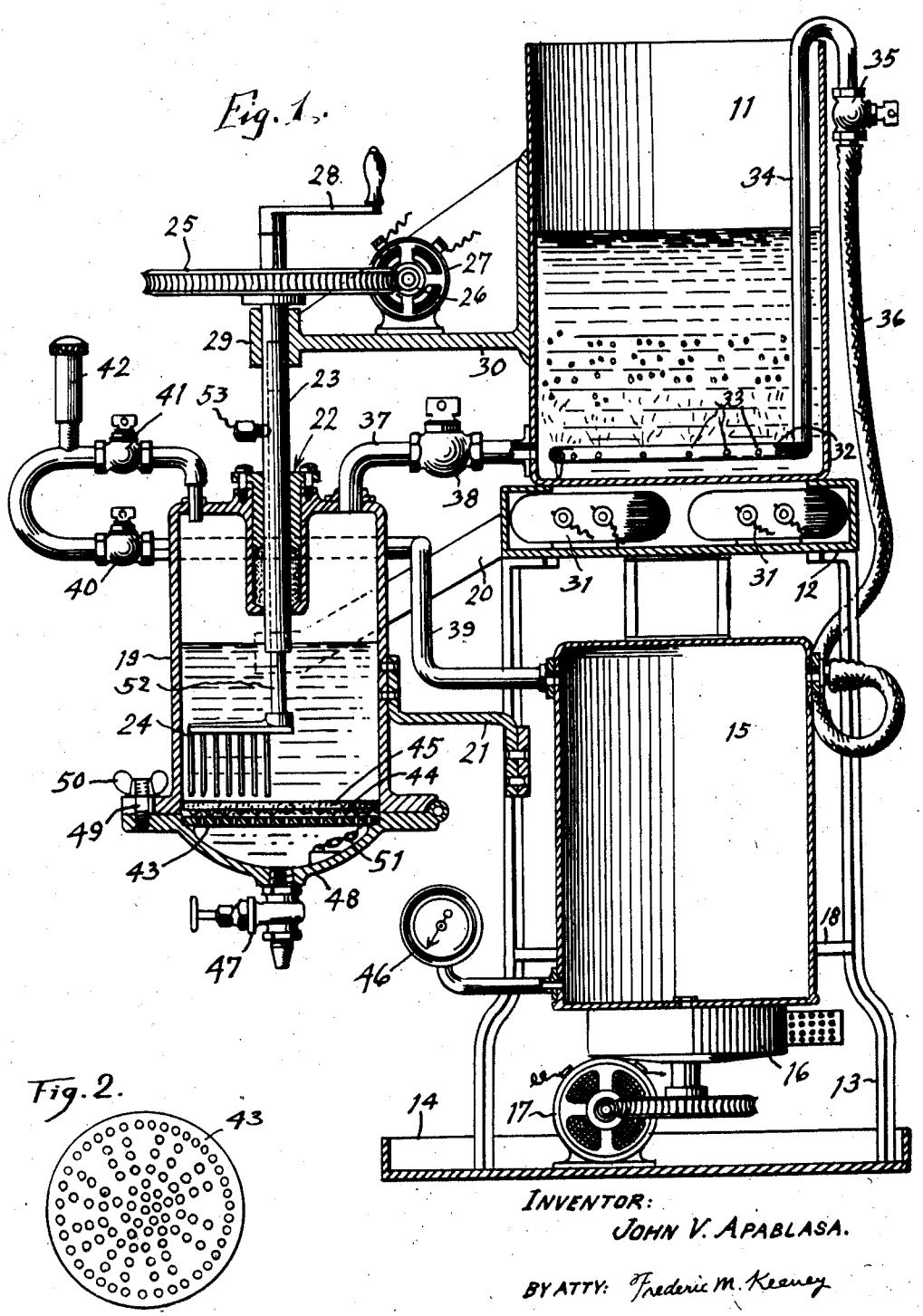

Dec. 29, 1925.  1,567,989
J. V. APABLASA
FILTER FOR RECLAIMING CRANK CASE OIL AND OTHER MINERAL
OILS AND ANIMAL FATS
Filed Oct. 18, 1924  2 Sheets-Sheet 1

INVENTOR:
JOHN V. APABLASA.
BY ATTY: Frederic M. Keeney

Dec. 29, 1925.  1,567,989
J. V. APABLASA
FILTER FOR RECLAIMING CRANK CASE OIL AND OTHER MINERAL
OILS AND ANIMAL FATS
Filed Oct. 18, 1924   2 Sheets-Sheet 2
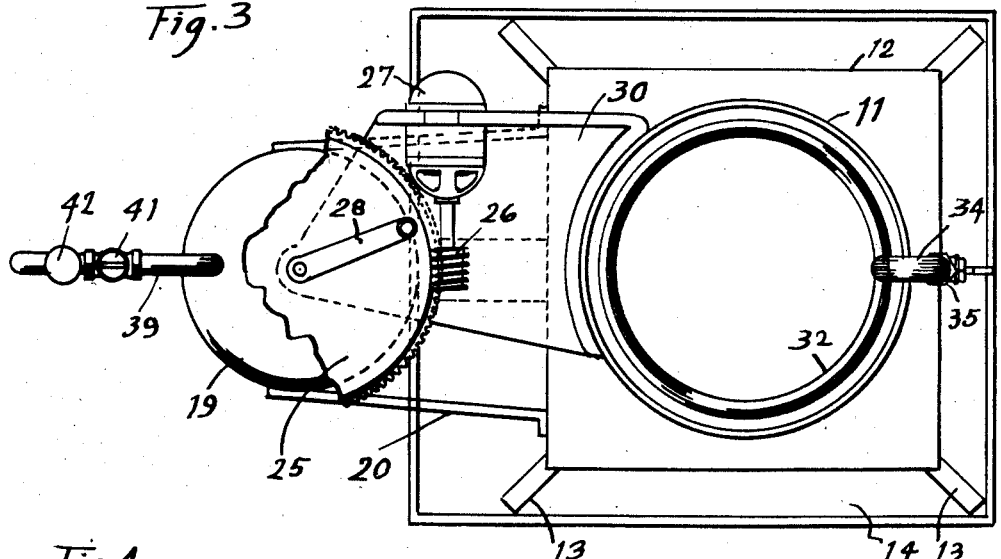
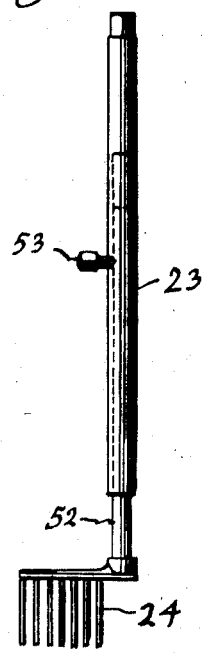
INVENTOR:
JOHN V. APABLASA.
BY ATTY. Frederic M. Keeney.

Patented Dec. 29, 1925.

1,567,989

UNITED STATES PATENT OFFICE.

JOHN V. APABLASA, OF LOS ANGELES, CALIFORNIA, ASSIGNOR TO CHARLES C. APABLASA, OF LOS ANGELES, CALIFORNIA.

FILTER FOR RECLAIMING CRANK-CASE OIL AND OTHER MINERAL OILS AND ANIMAL FATS.

Application filed October 18, 1924. Serial No. 744,430.

*To all whom it may concern:*

Be it known that I, JOHN V. APABLASA, a citizen of the United States, residing in the city and county of Los Angeles and State of California, have invented a new and useful Filter for Reclaiming Crank-Case Oil and Other Mineral Oils and Animal Fats, of which the following is a specification.

The present invention relates to an improved filter for reclaiming oils and fats, and particularly for crank-case oil, and comprehends filtering elements in combination with agitating elements and heating elements, whereby the oils and fats may be cleansed and restored to their original condition.

The invention has for its object to provide an improved means for agitating the material during the preheating step, and other improved means for agitating the material during the final filtering step, and includes means for producing a predetermined pressure within the filtering parts, means for agitating the material under pressure, and means for controlling the flow of the material during the filtering process.

Another object is to prevent a clogging of the filtering elements during the filtering process.

Another object is to provide an apparatus having various agitating means combined with improved heating means, whereby a large capacity is obtained with a small apparatus, and to provide an apparatus in which the actual volume of heated oil is relatively small, and therefore combines large capacity with great safety.

As is well known, lubricating oil, when used in the crank case of a combustion motor, soon becomes filled with an excess of solid substances, including free carbon and other non-lubricating elements, and the oil loses its efficiency for the purpose intended.

To treat the oil for purification, it is necessary to mix the same with clay, pulverized to the desired fineness, and with chemical solutions. These ingredients serve to collect the carbon and other non-lubricating elements which are to be removed from the oil which is to be purified.

My improved apparatus serves to accelerate the mixture of the ingredients which are added, to accelerate the collecting of the carbon and other elements which are to be removed from the oil, to accelerate the preheating step, to accelerate the filtering step, and to prevent the clogging of the device.

My invention, stated in general terms, consists of an apparatus constructed, arranged, and adapted for operation in substantially the manner hereinafter described and claimed.

The nature, scope and general features of my invention will be more fully understood by reference to the accompanying drawings, in which:

Figure 1 is a vertical and sectional elevation, of somewhat diagrammatic character, showing an embodiment of an apparatus for carrying out this invention. Fig. 2 is a plan view of the perforated filtering plate. Fig. 3 is a top plan view of the filtering case or chamber, and preheating tank. Fig. 4 is a detail view of the rotary agitator.

Referring to the drawings in detail, the preheating tank 11, is mounted above the heating chamber 12, which is supported by standards 13, extending upwardly from the base 14.

Beneath the heating chamber, I provide an an air pressure storage tank 15, and an air compressor 16, which is operated by an an electric motor 17. The tank 15 is supported by braces 18, connected to standards 13. The filter container 19, is supported by brackets 20, on each side, and a bracket 21, and is provided with a stuffing-box 22, in which is mounted the rotary shaft 23, having on its lower extremity, an agitator 24, and on its upper extremity a worm gear-wheel 25, adapted to be driven by the worm pinion 26, mounted on an electric motor 27. The agitator 24 may be manually manipulated, and for this purpose I provide the crank 28. Shaft 23 is journalled in a bracket bearing 29, in bracket 30, which also supports the motor 27.

Within the heating chamber 12, I provide a series of electric heaters 31, but gas heaters may be employed if desired. For the purpose of agitating the heated oil, I provide a tubular ring 32, having a series of apertures 33, and having an integral pipe 34 extending upwardly and beyond the limits of the tank, and at its outer extremity I provide a valve 35. A flexible pipe 36 connects the valve and the air tank 15. A pipe 37, leads from the oil tank 11 to the container 19, and is controlled by a valve 38, whereby the flow of the oil to the filtering elements may be regulated. A certain pressure within the container 19 is desirable. I therefore provide a pipe 39, leading from air tank 15 to the container 19, and having therein two control valves 40 and 41. A safety valve 42, which may be set to release the pressure at 130 pounds or over, is tapped into the pipe line 39, between valves 40 and 41; this arrangement allowing the pressure in the container to be controlled within desirable limits.

Within the container, and in addition to the agitator 24, I provide a perforated steel plate 43, which supports a wire screen 44, of fine mesh, and above the screen, a felt fabric 45 through which the oil is filtered. A pressure gauge 46 is provided for determining the pressure of the air within tank 15, but the desired pressure may be maintained by opening valve 40, whereupon the excess pressure is released by safety valve 42.

In use, the tank 15 is filled with air under pressure. The oil, or other material to be treated is then placed in tank 11, and the solution, and other necessary ingredients are added. Air pressure is released through the perforated ring and agitates the contents of tank 11. Meanwhile the electric heaters are heating the contents. A portion of the material is then drawn off into the container 19. The agitator 24 is then revolved at a speed of approximately twenty revolutions per minute. Air pressure is admitted to the container, and the purified oil percolates through the felt fabric 45, and is drawn off through the valve 47, at the bottom of cover 48, connected by hinge elements, with the container. Studs 49, fixed to the cover, are provided with wing-nuts 50, for securing the cover in its closed position. To refill the container 19, the valve 41 is closed, and the valve 38, opened. From time to time, the cover may be turned to open position for the purpose of examining the filtering elements. The perforated plate 43, is connected by a chain 51, with cover 48.

From the foregoing description, it may be seen that I have provided a simple and efficient apparatus for filtering used oils, and for purifying other mineral and animal oils and fats, and have described my invention in connection with an illustrative form of apparatus, materials, proportions, pressures, and arrangements, to the details of which disclosure the invention is of course not to be limited.

In the filtering of various oils and fats, it has been found desirable to add the clay in varying quantities in accordance with the nature of the substance to be treated. This has a tendency to form a deposit upon the top of the filtering elements. This deposit, if of correct thickness, also serves as a filtering element. To maintain this deposit in a uniform thickness, I have made the rotary agitator 24, adjustable. The shank 52 is arranged to telescope within the shaft 23, and is secured in its adjusted position by the set screw 53. The thickness of the film of clay upon the top of the filtering elements may therefore be regulated in accordance with the percentage of the clay added to the mixture within the heating tank.

If desired, filtering elements of varying thickness may be employed, and the agitator may be adjusted in accordance with such thickness for obtaining the best result with the greatest efficiency.

What is claimed is:

1. In a filtering device, a container, a cover at the bottom of the container, a perforated plate supported by the cover, a wire screen supported by the perforated plate, a thick pad of felt fabric upon the wire screen, means for introducing the material into the top of the container, means for preheating the material before it enters the container, a rotary agitator within the container, and above the felt fabric, means for operating the agitator with a rotary movement, and means for adjusting the agitator relatively to and from the filtering elements.

2. In a filtering device, a container, a cover at the bottom of the container, a series of filtering elements supported by the cover in its closed position, means for introducing the material to be filtered into the top of the container, means for preheating the material before it enters the container, a rotary agitator within the container and above the filtering elements, and means for adjusting the agitator relatively to and from the filtering elements.

3. In a filtering device, a container, a cover at the bottom of the container, a series of filtering elements supported by the cover in its closed position, rotatable agitating elements within the container and above the filtering elements, means for producing a pressure within the filter, and means for adjusting the agitating elements to and from the filtering elements to determine the thickness of the deposits thereon.

4. In a filtering device, a tank for preheating the material to be treated, means for agitating the material in the preheating tank, a container for the material in the final filtering step, means for regulating the flow of the material from the tank to the container, means for agitating the material within the container, means for introducing air pressure within the container, means for automatically regulating the air pressure delivered to the container operative when the pressure has reached a predetermined point, filtering elements at the bottom of the container, and means for varying the thickness of deposits on the top filtering element.

5. In a filtering device, a tank for preheating the material to be treated, means for agitating the material in the preheating tank including a tubular and perforated ring and a valve controlled pipe extending therefrom, an air pressure tank, an air compressor arranged to fill the pressure tank, a motor to drive the air compressor, a container for the final filtering step, a valve controlled pipe line leading from the preheating tank to the container, rotatable agitating means within the container, filtering elements at the bottom of the container, a pipe conduit leading from the pressure tank to the container, controlling valves in the pipe conduit, and a pressure release valve between said controlling valves.

6. In a filtering device, a preheating tank including heating devices for preheating the material to be filtered, a container for the material spaced apart from the preheating tank, means for communication between the tank and container, filtering elements mounted at the bottom of the container, a bracket extending from the said tank, a shaft journalled in the top of the container and said bracket, a rotary agitator within the container and above the filtering elements, a shank on the agitator in telescopic engagement with the shaft, means for actuating the shaft with a rotary movement, a set screw in the shaft and serving to hold the agitator and its shank in adjusted position, and a valve to control the flow from the container.

In testimony whereof, I hereunto affix my signature.

JOHN V. APABLASA.